United States Patent [19]
Fendrich, Jr.

[11] 3,714,511
[45] Jan. 30, 1973

[54] POWER SUPPLY PROTECTION CIRCUIT

[75] Inventor: Charles Nelson Fendrich, Jr., Elizabethtown, Pa.

[73] Assignee: AMP Incorporated, Harrisburg, Pa.

[22] Filed: April 10, 1972

[21] Appl. No.: 242,541

[52] U.S. Cl..................317/22, 317/31, 317/33 SC, 317/49, 321/14
[51] Int. Cl..............................H02h 7/10
[58] Field of Search....317/22, 33 SC, 31, 49; 321/14

[56] References Cited

UNITED STATES PATENTS

| 3,386,005 | 5/1968 | Roland et al. | 317/22 |
| 3,531,711 | 9/1970 | Fusco | 321/14 |

Primary Examiner—James D. Trammell
Attorney—William J. Keating et al.

[57] ABSTRACT

A circuit is disclosed for protecting a power supply including a Royer type inverter circuit from damage due to overloading. The protective circuit includes a capacitor for triggering a normally non-conductive silicon controlled rectifier in response to an increase in voltage across the switching transistors of the Royer circuit caused by overloading. When triggered, the silicon controlled rectifier reduces the output of a Darlington amplifier, which in turn reduces the power delivered to the switching transistors. The protective circuit may include a network for automatically returning the silicon controlled rectifier to its non-conductive state, thereby restoring normal operation of the overall power supply circuit.

10 Claims, 1 Drawing Figure

PATENTED JAN 30 1973　　3,714,511
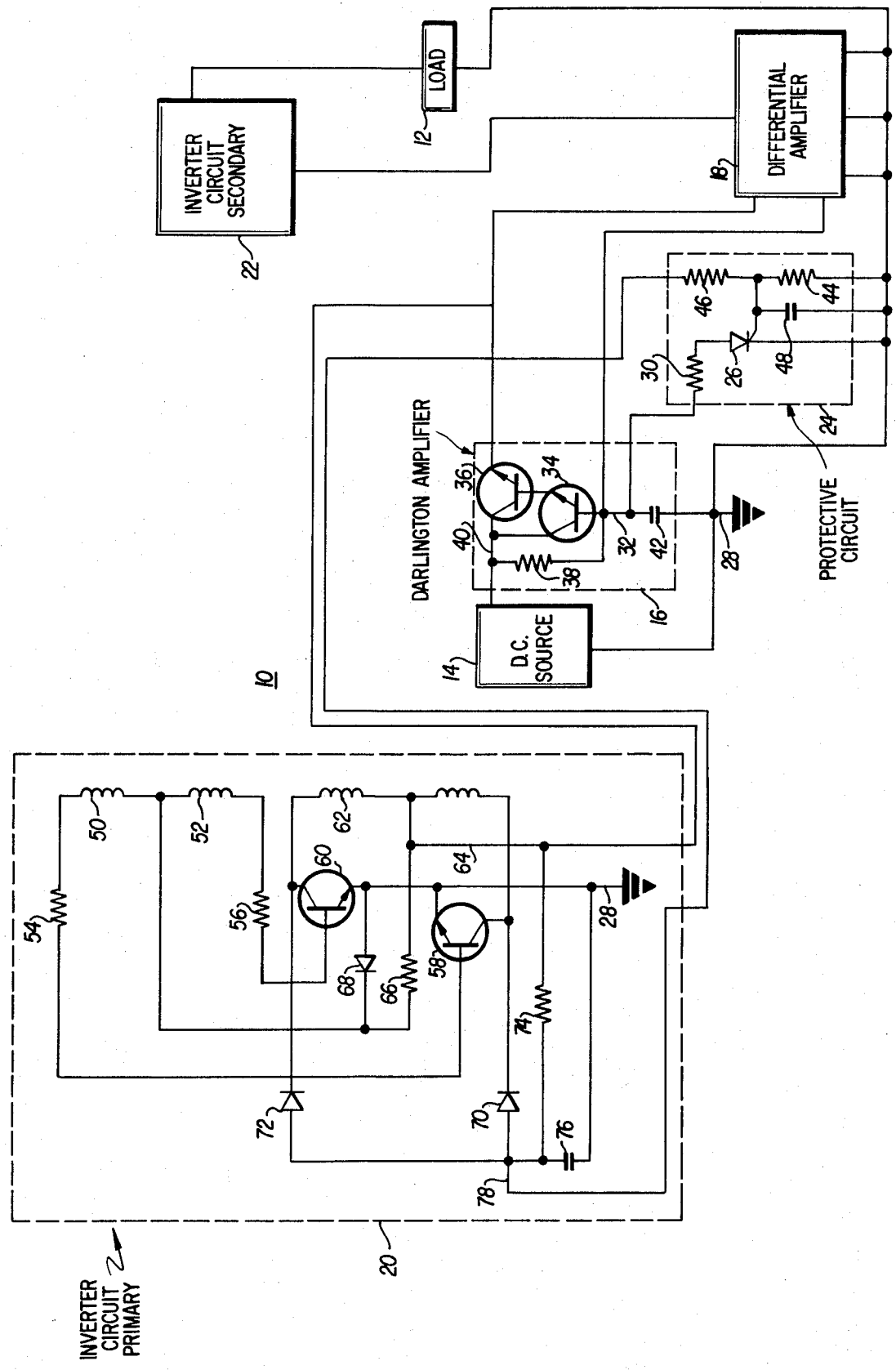

POWER SUPPLY PROTECTION CIRCUIT

BACKGROUND OF THE INVENTION

1. Field of the Invention

This invention relates generally to protective circuits, and more particularly to a silicon controlled rectifier circuit for protecting power supplies from damage due to overloading.

2. Description of the Prior Art

It is well known that solid state power supplies require protection against overload conditions, since overloads can cause excessive power dissipation and subsequent overheating and destruction of solid state components. The use of conventional fuses is an inadequate solution to this problem, since fuses are relatively slow acting devices, and cannot conveniently be automatically reset after the overload condition has passed.

Accordingly, fast acting silicon controlled rectifier circuits have been proposed in the past. For example, a high-speed, self-restoring solid state protective circuit which includes a silicon controlled rectifier is disclosed in U.S. Pat. No. 3,386,005 to Roland et al., issued May 28, 1968. The protective circuit described in this reference includes many highly desirable and advantageous features. However, this circuit has at least one significant disadvantage in that the silicon controlled rectifier included in it is triggered by excessive load current. Since the load may be a cathode ray tube for example, the normal load current is relatively low, ranging from approximately 200 microamps to only a few milliamps under normal conditions. Thus, a large triggering resistor must be included in the gate circuit of the silicon controlled rectifier disclosed in Roland et al. in order to develop a sufficient triggering voltage. However, the use of a large resistor in the gate circuit of the silicon controlled rectifier results in low switching sensitivity, and can cause the circuit to be sensitive to spurious AC signals. In addition, the protective circuit disclosed in the Roland et al., reference must dissipate a significant amount of power to sense overload currents, and is therefore somewhat inefficient in its operation.

SUMMARY OF THE INVENTION

Accordingly, one object of this invention is to provide an improved overload protection circuit which is relatively insensitive to spurious AC signals.

Another object of this invention is to provide an overload protection circuit which dissipates minimum power in detecting overload conditions.

Yet another object of this invention is to provide a novel protective circuit which detects overloading of the driving transistors in a power supply.

A still further object of this invention is to provide a novel overload protection circuit which is voltage rather than current sensitive.

A still further object of this invention is to provide a solid state overload protection circuit of improved switching sensitivity and reliability.

Briefly, these and other objects of the invention are achieved by providing a silicon controlled rectifier protective circuit which is directly responsive to voltage changes across the driving transistors of a power supply including a Royer type switching circuit. The gate electrode of the silicon controlled rectifier is coupled through a voltage divider to a capacitor which charges to approximately the voltage across the driving transistors of the power supply. When this voltage increases beyond a predetermined level, the voltage on the capacitor acts through the voltage divider to trigger the silicon controlled rectifier, thereby cutting off the power supply.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

The FIGURE is a combined circuit and block diagram of the preferred embodiment of the protective circuit of the instant invention.

DESCRIPTION OF THE PREFERRED EMBODIMENT

Referring now to the drawing, a power supply circuit indicated generally by the numeral 10, is shown coupled to a load 12. Power supply circuits of the type illustrated provide a closely regulated output voltage, and are particularly suitable for use in mobile equipment of the type often carried by aircraft or ships.

The power supply circuit 10 includes a conventional DC power source 14 which drives a Darlington amplifier circuit 16. A differential amplifier 18 and an inverter primary circuit 20 are driven by the output of the Darlington amplifier 16. Power is delivered to the load 12 through an inverter secondary circuit 22 which is magnetically coupled to the inverter primary circuit 20.

The differential amplifier 18 is preferably of the type illustrated in the above mentioned Roland et al., patent, although many types of conventional differential amplifier circuits can be used with the circuit of the present invention. The differential amplifier 18 compares the output of the inverter secondary circuit 22 with a suitable reference potential to regulate the output of the power supply circuit 10.

The inverter primary circuit 20 includes a Royer type switching circuit for converting a direct current input to an alternating current output. The inverter primary circuit 20 is structurally and functionally similar to that disclosed in the above-identified Roland et al., patent, although it has been modified in various respects to accomodate the protective circuit of the instant invention. Similarly, the inverter secondary circuit 22 is preferably of the type described in the above-identified Roland et al., patent, although other types of conventional inverter secondary circuits will operate satisfactorily with the circuit of the present invention.

A protective circuit 24 is shown coupled between the Darlington amplifier 16 and the inverter circuit primary 20. The protective circuit 24 includes a silicon controlled rectifier (SCR) 26, the cathode of which is coupled to a ground or other suitable reference potential 28, and the anode of which is coupled to one terminal of a current limiting resistor 30. The current limiting resistor 30 is selected to limit the maximum current flow through the SCR 26 to a value less than the maximum current rating of the SCR. The remaining terminal of the current limiting resistor 30 is coupled to a base lead 32 in the Darlington amplifier 16. The base lead 32 is the control terminal for a pair of transistors 34 and 36 coupled together in a conventional Darlington configuration. The transistor 36 is known as the pass transistor of the Darlington pair. A control resistor 38 is coupled between an input electrode 40 of the Darlington pair and the base lead 32. A capacitor 42 may optionally be coupled between the base lead 32 of the Darlington pair and the ground or reference potential 28.

Referring again to the protective circuit 24, the gate electrode of SCR 26 is coupled to a voltage divider comprised of a pair of resistors 44 and 46. A filter capacitor 48 is also preferably coupled between the gate electrode of SCR 26 and ground 28, in order to filter out voltage spikes or other spurious voltages which might otherwise accidentially trigger SCR 26.

The gate electrode of SCR 26 is coupled through voltage dividing resistor 46 to the inverter primary circuit 20. The inverter primary circuit includes a pair of base driving coils 50 and 52 which are coupled through a pair of resistors 54 and 56 to the base electrodes of a pair of output or driving transistors 58 and 60, respectively. The output transistors 58 and 60 drive a center tapped primary coil 62, the center tap of which is coupled through a lead 64 to the Darlington amplifier 16. The center tap of the primary coil 62 is also coupled through a resistor 66 to the center tap or junction between the base driving coils 50 and 52. The base driving coils 50 and 52 and the primary coil 62 are preferably mounted on the same saturable core. The collectors of the driving transistors 58 and 60 are connected across the primary coil 62, while the emitters of the two driving transistors are both coupled to a suitable reference potential such as ground 28. A diode 68 may also be coupled between the ground 28 and the junction between base driving coils 50 and 52. A pair of blocking diodes 70 and 72 are coupled to the collectors of driving transistors 58 and 60 at their cathodes, respectively, and are coupled together at their anodes. A resistor 74 is coupled between the lead 64 and the interconnected anodes of blocking diodes 70 and 72, while a triggering capacitor 76 is coupled between ground 28 and the junction of resistor 74 and the interconnected anodes of blocking diodes 70 and 72. A lead 78 couples the triggering capacitor 76 and the gate electrode of SCR 26 through the voltage dividing resistor 46.

When the power supply circuit 10 is operating in its normal mode, power is supplied from the DC source 14 through the Darlington amplifier 16 to the inverter primary circuit 20. In the inverter primary circuit the output or driving transistors function in cooperation with the base driving coils 50 and 52 and the primary coil 62 as a conventional Royer switching circuit. That is, driving transistors 58 and 60 which are oppositely phased, alternatively switch from a fully conductive or saturated state to a completely nonconductive state, thereby developing an alternating current in the primary coil 62, which is picked up by the inverter secondary circuit and subsequently fed to the load 12.

When the power supply circuit 10 is operating in its normal mode, the voltage on the triggering capacitor 76, which is approximately equal to the saturation voltage drop across one of the driving transistors 58 and 60 plus the voltage drop across either one of the blocking diodes 70 or 72, is quite low. For example, this voltage may be on the order of 1 volt. The resistors 44 and 46 of the voltage divider coupled to the gate of SCR 26 are chosen so that this voltage which normally exists on the triggering capacitor 76 is insufficient to trigger the SCR 26, and the SCR is thus non-conductive when the power supply circuit 10 is operating normally. The resistor 46 may have a relatively small value, on the order of 220 ohms for example, while the resistor 44 may have a somewhat larger value, on the order of 1Kohm for example. These relatively low resistance values in the gate circuit of SCR 26 permit the triggering circuit of the SCR to be made very sensitive to overload conditions existing in the power supply circuit 10, but relatively insensitive to spurious voltage spikes or AC signals existing in the environment of the power supply circuit.

As explained above, the voltage which is normally present on the triggering capacitor 76 is insufficient to fire the SCR 26, and thus the SCR remains in a nonconductive state when the power supply circuit 10 is operating in its normal mode. However, when an overload condition arises, the driving transistors 58 and 60 will either begin to come out of saturation, due to an inability to supply the excessive currents drawn by the load, or will go into a high frequency oscillation. In either case, the voltage on triggering capacitor 76, will increase, delivering a sufficient potential to the voltage dividing resistors 44 and 46 to fire SCR 26. When the SCR 26 is fired, the potential at the base lead 32 of Darlington amplifier 16 is substantially reduced, thereby greatly reducing the output of the Darlington amplifier. The reduced output of the Darlington amplifier effectively shuts off the inverter circuit primary 20, thereby preventing damage to the driving transistors 58 and 60, or to any of the other circuit components, due to the overload condition.

If it is desirable that the protective circuit 24 should be self-restoring, the value of the control resistor 38 is selected such that a current less than the required holding current is delivered to the SCR 26 after it is fired. This will automatically cause the SCR 26 to return to its nonconductive state, thereby reinstating normal operation of the power supply circuit 10. If the overload condition still exists, the SCR 26 will, of course, be triggered again and the above described sequence of operations will be repeated. However, if the control resistor 38 is selected to deliver a current which is equal to or greater than the holding current required by SCR 26, the SCR 26 will remain in its conductive state once an overload condition has been detected. If designed in this manner, the protective circuit 24 will render the power supply circuit 10 inoperative until the protective circuit is reset, as by manually switching off the DC source 10, for example.

If the optional capacitor 42 is included in the Darlington circuit 16, it will operate in substantially the same manner as set forth in detail in the above-identified Roland et al., patent. As described therein, the capacitor 42 can be used to supply a brief current pulse to the SCR 26 to render it conductive for a brief interval. Termination of the current pulse then causes the SCR 26 to return to its nonconductive state, assuming that the control resistor 38 is selected to supply a current substantially less than the holding current required to maintain the SCR 26 in its conductive state. Thus the optional capacitor 42 can be used to render the protective circuit 24 self-restoring.

From the foregoing disclosure it will be apparent that the circuit of the present invention provides a highly reliable, fast acting protective circuit for a power supply. It will also be apparent that the circuit of the present invention is a voltage responsive circuit which is stable, and highly resistant to the effects of spurious AC voltages.

Obviously numerous modifications and variations of the present invention are possible in light of the above teachings. It is therefore to be understood that within the scope of the appended claims, the invention may be practiced otherwise than as specifically described herein.

Accordingly what is claimed as new and desired to be secured by Letters Patent of the United States is:

1. A voltage responsive protective circuit for a power supply including a plurality of switching transistors, comprising:
    amplifier circuit means coupled to said switching transistors for supplying power to said switching transistors,
    energy storage means coupled to said switching transistors for developing a variable signal indicative of the operating condition of said switching transistors,
    protective circuit means coupled to said energy storage means, said protective circuit including electronic switching means selectively actuated by said energy storage means in response to the development by said energy storage means of a signal indicating a particular operating condition of said switching transistors; and,
    circuit means coupled between said protective circuit and said amplifier circuit means for reducing the output of said amplifier circuit means in response to actuation of said electronic switching means,
    whereby said power supply is protected against damage due to the existence of said particular operating condition for a prolonged interval of time.

2. A voltage responsive protective circuit as in claim 1, wherein:
    said protective circuit means includes voltage divider means; and,
    said voltage divider means is coupled to said energy storage means and to said electronic switching means.

3. A voltage responsive protective circuit as in claim 2, wherein:
    said electronic switching means comprises a silicon controlled rectifier including a gate electrode; and,
    said gate electrode is coupled to said voltage divider means.

4. A voltage responsive protective circuit as in claim 1, wherein:
    said amplifier circuit means includes a control electrode,
    said circuit means includes a current limiting means for limiting the maximum current flow through said protective circuit means; and,
    said circuit means is coupled to said control electrode.

5. A voltage responsive protective circuit as in claim 4, wherein:
    said amplifier circuit means includes capacitor means coupled to said control electrode and to said current limiting means for delivering a current pulse to said protective circuit means.

6. A voltage responsive protective circuit as in claim 1, wherein:
    said amplifier circuit means includes current control means coupled to said circuit means for returning said electronic switching means from its actuated state to its inactuated state.

7. A voltage responsive protective circuit as in claim 1, wherein:
    said protective circuit means includes second energy storage means for preventing said electronic switching means from being actuated by spurious signals.

8. A voltage responsive protective circuit as in claim 7, wherein:
    said electronic switching means comprises a silicon controlled rectifier including a gate electrode; and,
    said second energy storage means is coupled to said gate electrode.

9. A voltage responsive protective circuit as in claim 1, wherein:
    said amplifier circuit means includes current control means coupled to said circuit means for preventing said electronic switching means from returning to its inactuated state from its actuated state.

10. A voltage responsive protective circuit, as in claim 1, wherein:
    said variable signal indicative of the operating condition of said switching transistors is a voltage signal; and,
    said particular operating condition is an overload condition.

* * * * *